(12) United States Patent
Zuravleff

(10) Patent No.: US 6,914,650 B2
(45) Date of Patent: Jul. 5, 2005

(54) MIRROR CONTACT PATTERN FOR A DISPLAY DEVICE

(75) Inventor: William K. Zuravleff, Mountain View, CA (US)

(73) Assignee: Aurora Systems, Inc., San Jose, CA (US)

( * ) Notice: Subject to any disclaimer, the term of this patent is extended or adjusted under 35 U.S.C. 154(b) by 297 days.

(21) Appl. No.: 09/935,403

(22) Filed: Aug. 22, 2001

(65) Prior Publication Data

US 2003/0043306 A1 Mar. 6, 2003

(51) Int. Cl.[7] .................. G02F 1/1368; G02F 1/1343
(52) U.S. Cl. .................. 349/113; 349/143; 349/158; 349/187
(58) Field of Search .................. 349/43, 113, 139, 349/143, 158, 187; 257/59, 72; 438/30

(56) References Cited

U.S. PATENT DOCUMENTS 6,081,305 A * 6/2000 Sato et al. .................. 349/5
6,181,397 B1 * 1/2001 Ichimura .................. 349/113
2001/0013913 A1 * 8/2001 Young .................. 349/113
2003/0085404 A1 * 5/2003 Kim et al. .................. 257/72

* cited by examiner

*Primary Examiner*—Dung T. Nguyen
*Assistant Examiner*—Tai Duong
(74) *Attorney, Agent, or Firm*—Henneman & Saunders; Larry E. Henneman, Jr.

(57) ABSTRACT

A reflective LCD array (10) configured to minimize distortion in mirrors (14) thereof produced by attachment of a plurality of vias (16) to the mirrors (14). The vias (16) electrically connect the mirrors (14) to a metal layer (12) having circuitry thereon associated with the mirrors (14). The vias (16) are positioned equidistant about a center (30) of the mirrors (14) such that spacing of the vias (16) is generally equidistant from an X axis (26) and Y axis (28) of the reflective LCD array 10. The vias (16) are positioned such that such symmetry is retained even where circuitry associated with adjacent mirrors (14) is a reflected image copy of the reference mirror (14). Where even spacing about either the X axis (26) or the Y axis (28) is not practical, the vias (16) are grouped near the center (30) of the mirror (14) along that axis such that the effect is that of there being only a single via (16) along such axis.

44 Claims, 5 Drawing Sheets

MIRROR CONTACT PATTERN FOR A DISPLAY DEVICE

TECHNICAL FIELD

The present invention relates to the field of integrated circuit manufacture, and more specifically to an improved method and construction for the manufacture of light reflective liquid crystal display ("LCD) arrays. The predominant current usage of the present inventive improved mirror contact pattern is in the construction of reflective LCD arrays for projection display devices, wherein it is desirable to keep the surface of the array as flat and flawless as possible.

BACKGROUND ART

In the construction of light reflective LCD arrays it is necessary to make some electrical connection between the circuitry thereof and the actual reflective surface. The accepted practice for accomplishing this purpose is to provide conductive "vias" through an insulating layer which separates the mirrors from the underlying circuitry layers. Studies have shown that, despite the best known manufacturing techniques, there is a minute perturbation or distortion, in the form of dimples, of the mirror surface where the vias contact the mirrors.

Unfortunately, the distortion of the mirrors caused by the vias can result in visibly perceptible distortion of an image produced by the LCD array. It would be desirable to have some method or means to eliminate, or at least reduce, the perceptible effects of such physical distortion of the mirrors. However, to the inventor's knowledge, although this problem is known in the prior art, there has been no practical solution for the problem.

DISCLOSURE OF INVENTION

Accordingly, it is an object of the present invention to provide a method and apparatus for minimizing the perceptible effects of distortion caused by via contact with the mirrors in a reflective LCD array.

It is another object of the present invention to provide a method and apparatus for improving the quality of an image produced by a reflective LCD array.

It is yet another object of the present invention to provide a method and apparatus for producing a reflective LCD array which can be readily implemented using known manufacturing techniques.

Briefly, a known embodiment of the present invention is an arrangement of vias in a reflective LCD array such that overall distortion of the mirror surface is kept to a minimum, and further such that what distortion remains is less offensive to the eye than some alternative placements might be. In the embodiment described herein, two contact vias are placed according to several criteria for placement, which criteria are intended to cause the resulting mirror surface to tend toward the above stated objectives.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

DETAILED DESCRIPTION OF THE INVENTION

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

Figure 1:
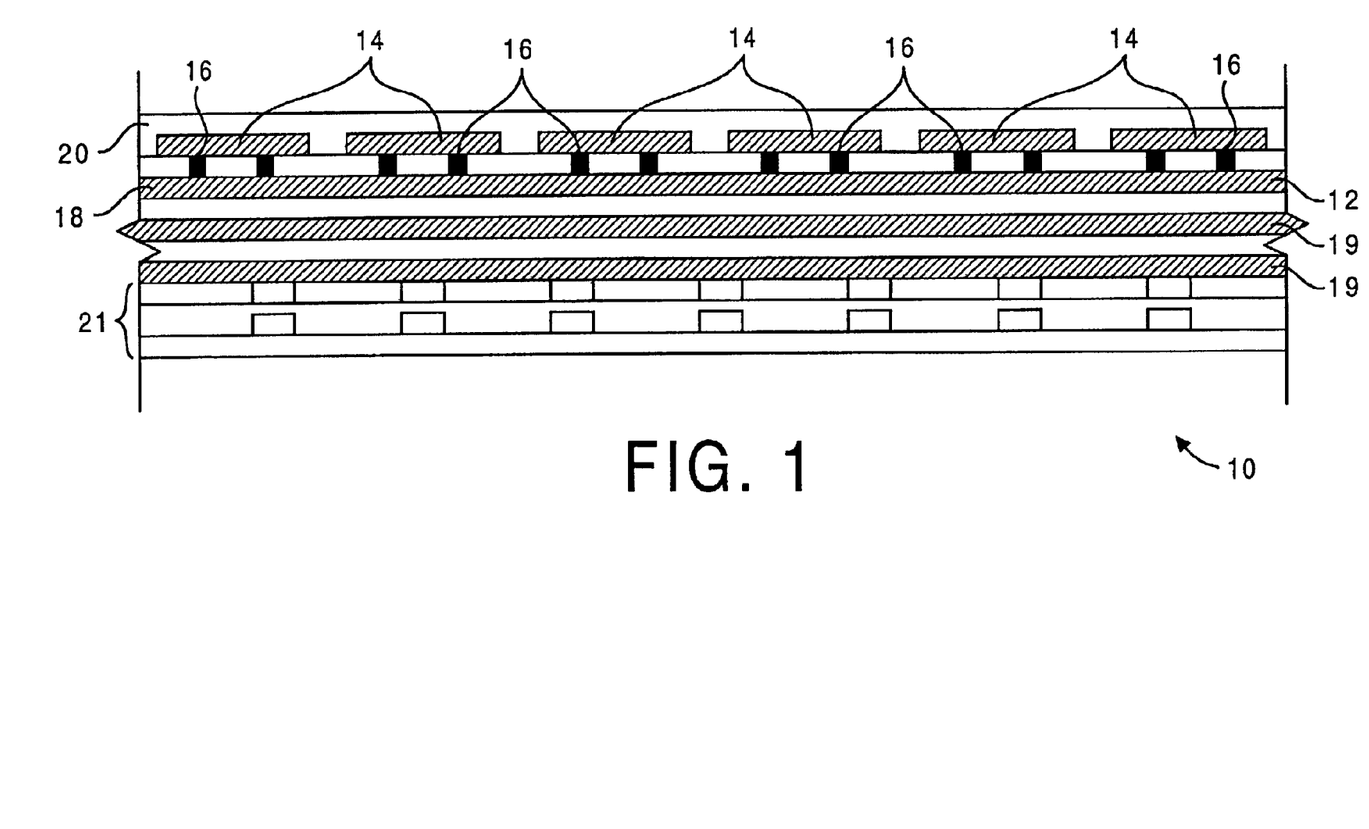
FIG. 1 is a cross-sectional, side elevational view of a portion of an example of a reflective LCD array, according to the present invention.

FIG. 1 is a diagrammatic (not to scale) cross-sectional, side elevational view of a small portion of an example of a reflective LCD array, according to the present invention, which is designated therein by the general reference character 10. A metal (circuitry) layer 12 is connected to a plurality (six are shown in this example segment) of mirrors 14 by a plurality of vias 16. The vias 16 pass through an insulating layer 18, and a clear protective layer 20 is over the mirrors 14. One skilled in the art will recognize that this is not an exhaustive list of the components of the reflective LCD array 10. For example, in most applications there will be at least some additional metal layers 19 and display driver circuitry layers (not shown in detail) below the metal layer 12. However, the portions of the reflective LCD array 10 which are relevant to the present invention are shown in the view of FIG. 1.

It will be noted that, in the example of FIG. 1, two vias 16 per mirror 14 are shown. In the prior art it has been common to use only one via 16 per pixel. While the inventor believes that the use of two vias 16 per mirror 14 will be effective for practicing the present invention, it should be recognized that the present invention is not limited to the use of two vias 16 per mirror 14, and other quantities of vias 16 could be used, according to the principles described herein, to practice the invention. Indeed, in the example of the reflective LCD array 10 shown, both of the vias 16 are used as electrical conductors. However, it is within the scope of the invention that "dummy" vias (not shown) could be used, again according to the principles described herein, to practice the invention.

Figure 2:
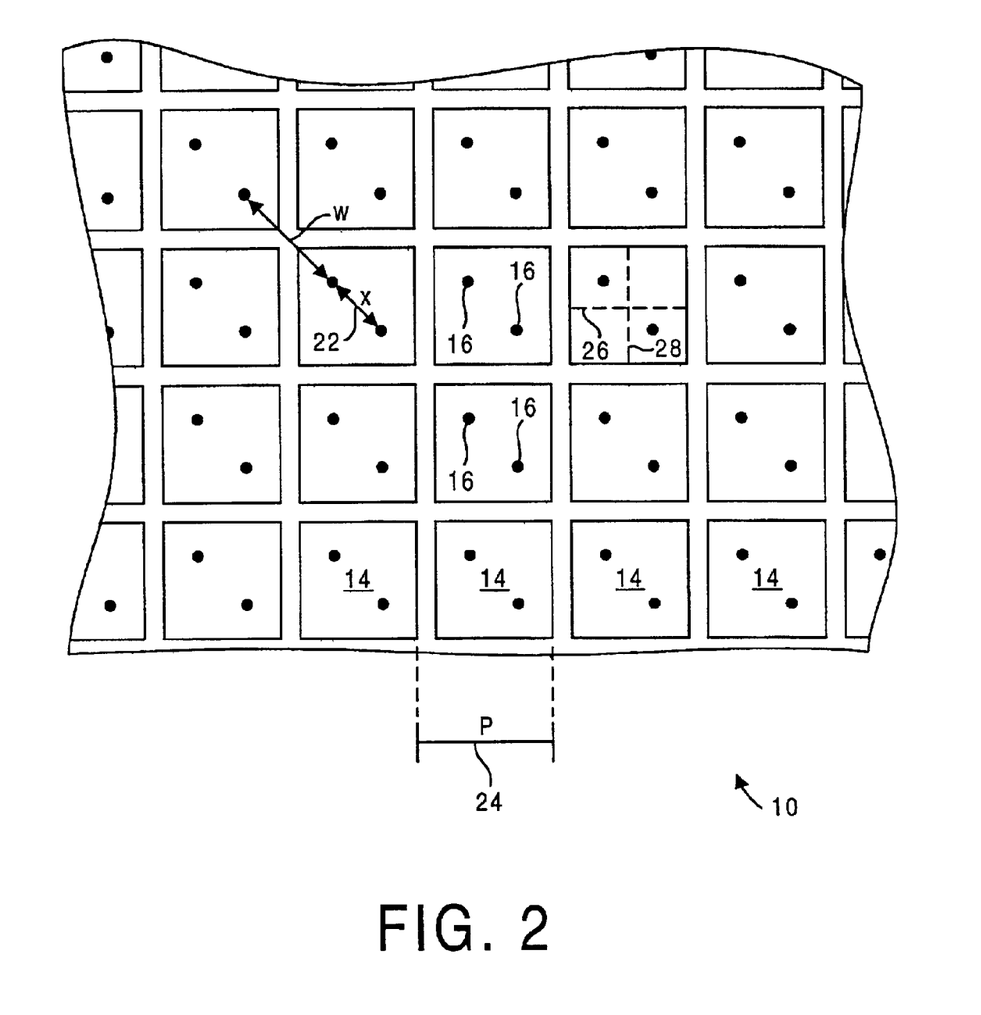
FIG. 2 is a top plan view of a portion of the reflective LCD array of FIG. 1.

FIG. 2 is a top plan view of an example of the reflective LCD array 10. In the view of FIG. 2 the vias 16 are visible through the mirrors 14, and the clear protective layer 20 (FIG. 1) cannot be seen. According to the example of FIG. 2, the vias 16 are placed along a diagonal of the generally square mirrors 14. The spacing (X) 22 of the vias 16 is related to the pitch (P) 24 of the mirror 14 layout according to the following formula:

$$X = \frac{P * \sqrt{2}}{2}$$

Those skilled in the art will understand that the pitch (P) is defined as the distance between corresponding features of adjacent cells.

According to the example of the placement of the vias 16 shown in the example of FIG. 2, the vias 16 are uniformly spaced across the mirror surface of the reflective LCD array 10 and, further each mirror 14 has an identical (or as nearly identical as possible) arrangement of the vias 16. Because the spacing (X) of the vias 16 under each mirror 14 is determined according to the above formula, and because the vias 14 are arranged symmetrically about the center, and on a diagonal of the mirror 14, the spacing (W) between diagonally adjacent vias 16 of adjacent mirrors 14 is the same as the spacing (X) between vias 16 of each mirror 14. Distances (X) and (W) do not appear equal in the drawings, because the pixel mirrors 14 and the gaps therebetween are not drawn to scale. The inventor has found that such an arrangement is most desirable, since the eye readily detects regular, unequal spacing (not shown) of the vias 16 as a phenomenon known as "banding". Indeed, as will be discussed in more detail hereinafter, even random irregularity is preferable to regular uneven spacing in this respect.

It is generally understood in the art that the number of vias should be kept to a minimum in reflective displays used In video projection systems, because vias distort the surface of the reflective pixel mirrors formed therefore, causing scattering of light reflected off the pixel mirrors 14. The scattered light is lost to downstream projection optics and, therefore, reduces the brightness of the projected image. Accordingly, it is desirable to keep the relative surface area that the vias 16 occupy of each pixel mirror 14 to a minimum. On the other hand, it is also known that scattering may be desirable in displays that arc intended to be directly viewed by an observer. In such displays, a large number of vias (occupying approximately 50 percent of the pixel mirror area) can be intentionally used to increase scattering. In order to distinguish these two types of displays, an arbitrary value of 25 percent of via surface area to pixel mirror surface area is selected. Displays used in projection systems and the like will have a value of via area/pixel mirror area far below 25 percent, whereas displays used in direct viewing systems will have a via (or other distortion) area/pixel mirror area in excess of 25 percent.

As can be seen in the view of FIG. 2. The vias 16 are spaced such that they are equidistant from an X axis 26 and also from a Y axis 28 of each individual mirror 14. However, the vias 16 are not symmetrical about the X axis 26 and the Y axis 28, in that a reflected image of the via 16 would not produce an identical pattern. The term "axis" herein is used in the sense of being relative to the X or Y axis of a two dimensional graphical layout. That is, the X axis 26 and Y axis 28 lie on a plane which is the surface of the mirrors 14 and each is perpendicular to the sides of the generally square mirrors 14.

It should be noted that while the arrangement of the vias 16 shown in the example of FIG. 2 is ideal for accomplishing the one purpose of providing the most regular and uniform mirror 14 surfaces available using two vias 16 per mirror 14, it may not be possible or practical to use such an arrangement. For example, one skilled in the art of chip layout will recognize that alternate mirrors 14 may have associated circuitry which is "mirrored" or reflected. That is every other mirror 14 may have identical circuitry there beneath, while alternate mirrors 14 may have circuitries which are alike to each other, but which are the reflected images of that on either side thereof. Under such circumstances, using the diagonal layout of the example of FIG. 2 would result in a regular asymmetry which, as described above, is a most undesirable condition.

Figure 3:
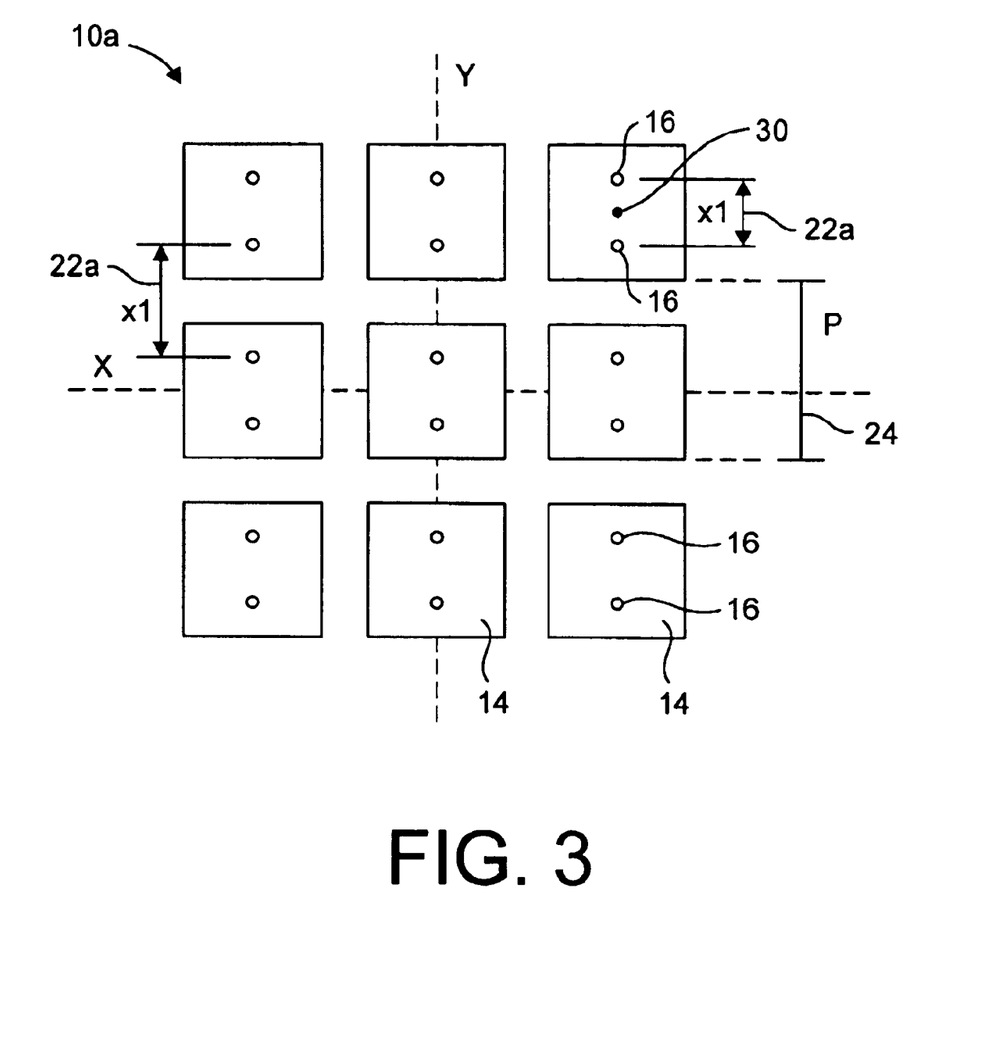
FIG. 3 is a top plan view of a portion of another embodiment of the inventive reflective LCD array.

FIG. 3 is a top plan view of another example of a reflective LCD array 10a, according to the present invention, showing an alternate arrangement of the vias 16. As can be seen in the view of FIG. 3, the vias 16 in this example have a mirror spacing (X1) 22a along the Y axis 28 which is ½ P, while the vias 16 are centered in the mirrors 14 along the X axis. This layout does not provide for as uniform a layout of the vias 16 as is shown in the example of FIG. 2, as the spacing is closer along the Y axis as compared to that along the X axis. However, it will be noted that the example of FIG. 3 does provide for symmetrical arrangement of the vias 16 along the X axis 26 and also along the Y axis 28. This prevents the undesirable banding effect discussed above. Also, it will be noted that "mirroring" of alternate mirror 14 cells is acceptable, since mirroring the arrangement of vias 16 shown in FIG. 3 will result in an identical arrangement. It should be noted that, in this example as in all of the examples discussed herein, the vias 16 are evenly spaced about a center 30 of the mirror 14, where this is possible and practical.

Figure 4:
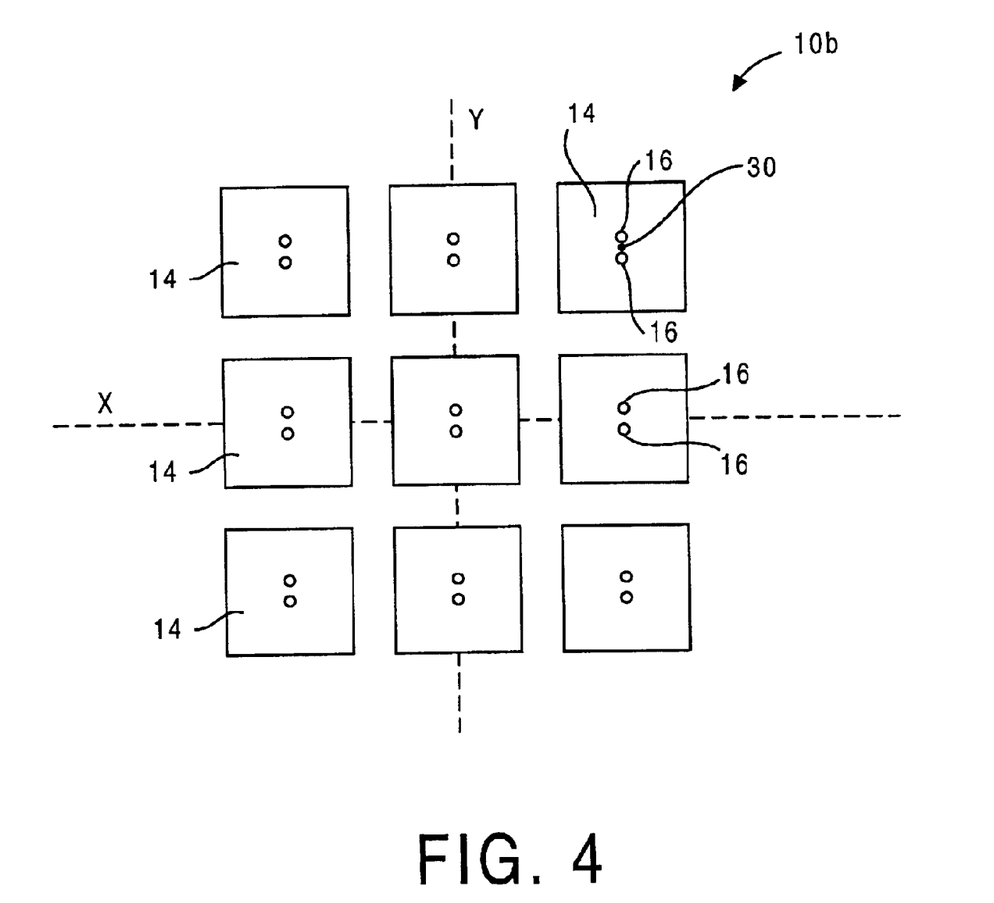
FIG. 4 is a top plan view of a portion of yet another example of the inventive reflective LCD array.

FIG. 4 is a top plan view of yet another example of a reflective LCD array 10b, according to the present invention. In the example of FIG. 4 it can be seen that the vias 16 are centered in the mirrors 14 along the Y axis (as in the example of FIG. 3). However, in the example of FIG. 4 the vias 16 are placed close together and near the centers 30 of the mirrors 14. The example of FIG. 4 illustrates the principle, according to the present invention, that the vias 16 may be grouped closely together near the center of the mirrors 14 to produce a generally uniform distortion of the mirrors 14. That is, where only a single via 16 per mirror 14 is used, the best place to put that via 16 would be at the center of the mirror 14, thereby providing for symmetry along both the X axis 26 and the Y axis 28. Similarly, where a plurality (two, in the present example) of vias 16 are grouped together near the center of the mirror 14, then a single distortion near the center of the mirror 14 will be produced, thereby providing the desired symmetry along the X axis 26 and the Y axis 28 even though the vias 16 are not uniformly distributed on the mirrors 14.

Figure 5:
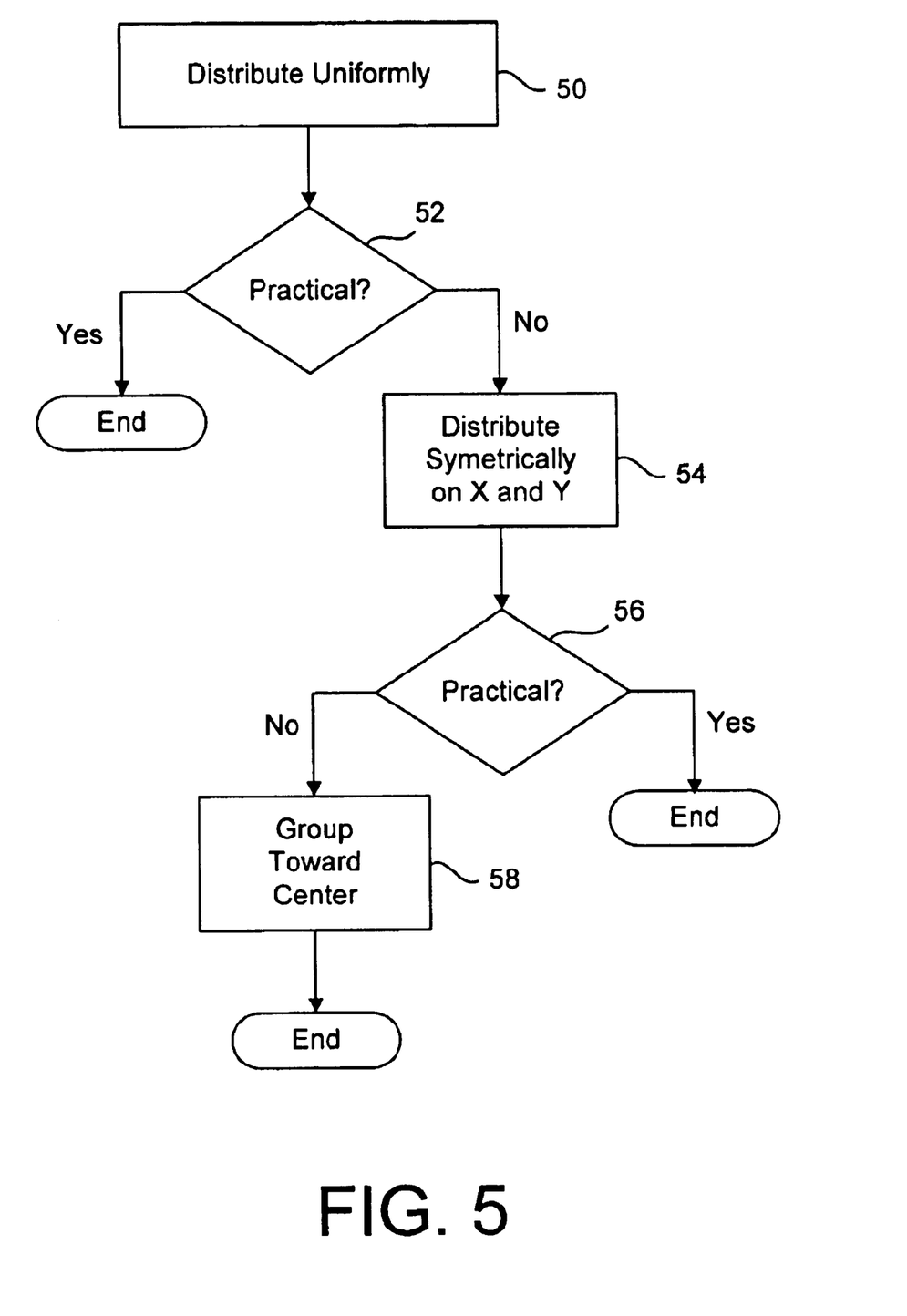
FIG. 5 is a flow diagram depictive the present inventive method for placing vias in a LCD array.

FIG. 5 is a flow diagram depicting an example of the present inventive method for placing the vias 16 on the reflective LCD array 10. As previously discussed herein, if possible and practical, the vias 16 should be distributed uniformly on the reflective LCD array 10 such that the extremes of peaks and valleys of the dimples on the surface of the mirrors 14 will be minimized. This is because the more uniform the spacing of the vias 16, the smaller will be the largest space therebetween, wherein a dimple might form. This is accomplished (experimentally) in a distribute uniformly operation 50. In a first decision operation 52 it is determined if this arrangement is possible and practical, considering the underlying circuitry as discussed previously herein. If it is both possible and practical, then the operation is ended, and the arrangement is accepted. If not, then positioning the vias 16 symmetrically on both the X axis 26 and the Y axis 28 is considered in a distribute symmetrically operation 54. As discussed previously herein, the vias 16 can be placed symmetrically on the X axis 26 and also symmetrically on the Y axis 28, even though the spacing of the vias 16 may be different along the X axis 26 than along the Y axis 28.

In a second decision operation 56 it is determined if the arrangement according to the previous operation is both possible and practical. If not, the vias 16 can be grouped toward the center 30 on one (preferably ) or both (if necessary) axis 26 and 28 in a group toward center operation 58.

Various modifications may be made to the invention without altering its value or scope. For example, quantities and/or placement of the vias 16 can be different from the examples shown while keeping the spirit of the invention according to the inventive method described.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting, and the appended claims are to be interpreted as encompassing the entire scope of the invention.

INDUSTRIAL APPLICABILITY

The inventive reflective LCD array 10 is intended to be widely used in the production of video imaging devices, particularly where the size and/or criticality of the display requirements call for minimal distortion and optimal image clarity and resolution. According to the present invention, a plurality of vias 16 are positioned in a manner to solve the problem of distortion caused by the vias. The present invention does not address the problem of the physical distortion caused by the vias 16. Rather, the invention assumes that manufacturing techniques will be optimized to minimize such physical distortion. Instead, the present invention operates to minimize the perceived effect of any such residual distortion.

Since the reflective LCD arrays 10 of the present invention may be readily produced using known manufacturing methods and operations, and since the advantages as described herein are provided, it is expected that it will be readily accepted in the industry. For these and other reasons, it is expected that the utility and industrial applicability of the invention will be both significant in scope and long-lasting in duration.

I claim:

1. An LCD array comprising:
a semiconductor substrate;
a metal circuitry layer formed above the semiconductor substrate;
an insulating layer formed above the metal circuitry layer;
a plurality of reflective imaging surfaces formed above the insulating layer; and
a plurality of vias between the metal layer and each of the imaging surfaces; and
wherein each of the vias passes through the insulating layer; and
the vias of each imaging surface occupy no more than 25% of the surface area of the imaging surface.

2. The LCD array of claim 1, wherein:
each of the vias is an electrical connection between the metal layer and the imaging surfaces.

3. The LCD array of claim 1, wherein:
the imaging surfaces are mirrors.

4. The LCD array of claim 1, wherein:
the quantity of vias is two per imaging surface.

5. The LCD array of claim 1, wherein:
the vias are uniformly distributed along both a first direction and a second direction of the LCD array.

6. The LCD array of claim 1, wherein:
the vias underlying each imaging surface are equidistant from a first axis of the respective imaging surface.

7. The LCD array of claim 6, wherein:
the vias underlying each imaging surface are equidistant from a second axis of the respective imaging surface.

8. The LCD array of claim 1, wherein:
the vias are grouped near a center of each of the imaging surfaces; and
the vias are disposed on at least one of an X axis and a Y axis of the imaging surfaces.

9. The LCD array of claim 1, wherein:
all of the vias of each imaging surface lie on a single line; and
the vias are symmetrically arranged about an axis perpendicularly bisecting the single line.

10. The LCD array of claim 1, wherein the LCD array is suitable for use in a video projection system.

11. The LCD array of claim 1, wherein the smallest distance between the nearest vias of any two adjacent imaging surfaces is at least ½P, where P is the distance between corresponding features of adjacent imaging surfaces.

12. The LCD array of claim 1, wherein:
the vias are arranged along a diagonal of the imaging surface; and
the spacing between each via of each imaging surface along the diagonal is given by the formula $$\frac{P\sqrt{2}}{2},$$

where P is the distance between corresponding features of adjacent imaging surfaces.

13. A method for positioning vias under mirrors of an LCD array, comprising:
placing a plurality of vias under each of a plurality of mirrors such that the vias are evenly spaced from the center of each respective mirror with respect to both an X axis and a Y axis of the respective mirror; and wherein
the vias of each mirror occupy no more than 25% of the surface area of the mirror.

14. The method for positioning vias under mirrors of an LCD array of claim 13, and further including:
grouping the vias near the center of each respective mirror on at least one of the X axis and the Y axis of the respective mirror.

15. The method of claim 13, wherein said step of placing a plurality of vies under each of a plurality of mirrors further comprises:
placing all of the vias under each mirror on a single line; and
arranging the vias on the line such that the vies are symmetric about an axis perpendicularly bisecting the line.

16. The method of claim 13, wherein the LCD array is suitable for use in a video projection system.

17. The method of claim 13, wherein the step of placing the vias under each of a plurality of mirrors includes placing the vias such that smallest distance between the nearest vias of any two adjacent mirrors is at least ½P, where P is the distance between corresponding features of adjacent mirrors.

18. The method of claim 13, wherein:
the step of placing said vias under each of a plurality of mirrors includes arranging the vias along a diagonal of each of the mirrors; and
the spacing between each via of each mirror along the diagonal is given by the formula $$\frac{P\sqrt{2}}{2},$$

where P is the distance between corresponding features of adjacent mirrors.

19. A method for making LCD array, said method comprising:
providing a semiconductor substrate;
forming a metal layer above the semiconductor substrate;
forming an insulating layer above the metal layer;
forming a plurality of reflective imaging surfaces above the insulating layer; and
providing a plurality of vias between the metal layer and each of the imaging surfaces such that the vias are evenly distributed on the imaging surfaces and pass through the insulating layer; and wherein
the vias of each imaging surface occupy no more than 25% of the surface area of the imaging surface.

20. The method of claim 19, wherein:
the vias are symmetrically arrayed about at least one of an X axis and a Y axis of the LCD array.

21. The method of claim 19, wherein:
the quantity of vias associated with each imaging surface is two; and
the vias are symmetrically arrayed about at least one of an X axis and a Y axis of the LCD array; and
the vias are grouped together near the center of the imaging surface on at least one of the X axis and the Y axis of the imaging surface.

22. The method of claim 19, wherein:
each of the vias is an electrical conductor between the metal layer and one of the imaging surfaces.

23. The method of claim 19, wherein:
the vias are symmetrically arrayed about a first axis of the LCD array.

24. The method of claim 23, wherein:
the vias are symmetrically arrayed about a second axis of the LCD array.

25. The method of claim 23, wherein:
the vias of each imaging surface are grouped together about a center of each respective imaging surface; and
the vias of each imaging surface are aligned along an axis of each respective imaging surface, the axes of the imaging surfaces being parallel to one another.

26. The method of claim 19, wherein:
two of the vias are positioned near the center of each of the imaging surfaces along a direction parallel to at least one axis of the LCD array.

27. The method of claim 19, wherein:
two of the vias are symmetrically arrayed about an axis parallel to at least one of an X axis and a Y axis of the LCD array on each of the imaging surfaces.

28. The method of claim 19, wherein:
two of the vias are disposed along an axis parallel to a Y axis of the LCD array on each of the imaging surfaces.

29. The method of claim 19, wherein providing a plurality of vias further comprises:
positioning the vias such that all of the vias of each reflective imaging surface lie on a single line and are symmetric about an axis perpendicularly bisecting the line.

30. The method of claim 19, wherein said LCD array is suitable for use in a video projection system.

31. The method of claim 19, wherein the smallest distance between the nearest vias of any two adjacent imaging surfaces is at least ½P, where P is the distance between corresponding features of adjacent imaging surfaces.

32. The method of claim 19, wherein:
the vias are arranged along a diagonal of the imaging surface; and
the spacing between each via of each imaging surface along the diagonal is given by the formula $$\frac{P\sqrt{2}}{2},$$

where P is the distance between corresponding features of adjacent imaging surfaces.

33. An LCD array, comprising:
a semiconductor substrate;
a metal circuitry layer formed above the semiconductor substrate;
an insulating layer formed above the metal circuitry layer;
a plurality of reflective imaging surfaces formed above the insulating layer; and
a plurality of vias between the metal layer and each of the imaging surfaces; and wherein
the vias of each imaging surface are arranged in a group;
the groups of vias are evenly spaced along an X direction of the LCD array;
the groups of vias are evenly spaced along a Y direction of the LCD array; and
the vias of each imaging surface occupy no more than 25% of the surface area of the imaging surface.

34. An LCD array, comprising:
a semiconductor substrate;
a metal circuitry layer formed above the semiconductor substrate;
an insulating layer formed above the metal circuitry layer;
a plurality of reflective imaging surfaces formed above the insulating layer; and
a plurality of vias between the metal layer and each of the imaging surfaces; and
wherein the vias are equidistant from an X axis of each of the imaging surfaces; and
the vias of each imaging surface occupy no more than 25% of the surface area of the imaging surface.

35. The LCD array of claim 34, wherein:
the vias are equidistant from a Y axis of each of the imaging surfaces.

36. A method for making an LCD array, said method comprising:
providing a semiconductor substrate;
forming a metal layer above the semiconductor substrate;
forming an insulating layer above the metal layer;
forming a plurality of reflective imaging surfaces above the insulating layer; and
providing a plurality of vias between the metal layer and each of the imaging surfaces such that the vias are evenly distributed on the imaging surfaces; and wherein the quantity of vias associated with each imaging surface is two;

the vias are symmetrically arrayed on at least one of an X axis and a Y axis; and the vias are grouped together near the center of the imaging surface on at least one of the X axis and the Y axis.

37. A method for making an LCD array, said method comprising:

providing a semiconductor substrate;

forming a metal layer above the semiconductor substrate;

forming an insulating layer above the metal layer;

forming a plurality of reflective imaging surfaces above the insulating layer; and providing a plurality of vias between the metal layer and each of the imaging surfaces such that the vias are evenly distributed on the imaging surfaces; and wherein the vias are symmetrically arrayed along a first axis of the LCD array;

the vias are symmetrically arrayed along a second axis of the LCD array; and the vias of each imaging surface occupy no more than 25% of the surface area of the imaging surface.

38. A method for making an LCD array, said method comprising:

providing a semiconductor substrate;

forming a metal layer above the semiconductor substrate;

forming an insulating layer above the metal layer;

forming a plurality of reflective imaging surfaces above the insulating layer; and providing a plurality of vias between the metal layer and each of the imaging surfaces such that the vias are evenly distributed on the imaging surfaces; and wherein the vias are symmetrically arrayed along a first axis of the LCD array;

the vias of each imaging surface are grouped together about a center of each respective imaging surface;

the vias of each imaging surface are aligned along an axis of each respective imaging surface, the axes of the imaging surfaces being parallel to one another; and the vias of each imaging surface occupy no more than 25% of the surface area of the imaging surface.

39. A method for making an LCD array, said method comprising:

providing a semiconductor substrate;

providing a metal layer above the semiconductor substrate;

providing an insulating layer above the metal layer;

providing a plurality of reflective imaging surfaces above the insulating layer; and providing a plurality of vias between the metal layer and each of the imaging surfaces such that the vias are evenly distributed on the imaging surfaces; and wherein two of the vias are positioned near the center of each of the imaging surfaces along at least one axis of the LCD array; and the vias of each imaging surface occupy no more than 25% of the surface area of the imaging surface.

40. A method for making an LCD array, said method comprising:

providing a semiconductor substrate;

providing a metal layer above the semiconductor substrate;

providing an insulating layer above the metal layer;

providing a plurality of reflective imaging surfaces above the insulating layer; and providing a plurality of vias between the metal layer and each of the imaging surfaces such that the vias are evenly distributed on the imaging surfaces; and wherein two of the vias are symmetrically arrayed along at least one of an X axis and a Y axis of the LCD array on each of the imaging surfaces; and the vias of each imaging surface occupy no more than 25% of the surface area of the imaging surface.

41. A method for making an LCD array, said method comprising:

providing a semiconductor substrate;

providing a metal layer above the semiconductor substrate;

providing an insulating layer above the metal layer;

providing a plurality of reflective imaging surfaces above the insulating layer; and providing a plurality of vias between the metal layer and each of the imaging surfaces such that the vias are evenly distributed on the imaging surfaces; and wherein two of the vias are symmetrically arrayed along a Y axis of the LCD array; and the vias of each imaging surface occupy no more than 25% of the surface area of the imaging surface.

42. An LCD array comprising:

a semiconductor substrate;

a metal circuitry layer formed above the semiconductor substrate;

an insulating layer formed above the metal circuitry layer;

a plurality of reflective imaging surfaces formed above the insulating layer; and a plurality of vias between the metal layer and each of the imaging surfaces; and wherein each of the vias passes through the insulating layer under the imaging surfaces; and the vias of each imaging surface occupy no more than 25% of the surface area of the imaging surface.

43. An LCD array comprising:

a semiconductor substrate;

a metal circuitry layer formed above the semiconductor substrate;

an insulating layer formed above the metal circuitry layer;

a plurality of reflective imaging surfaces formed above the insulating layer; and a plurality of vies between the metal layer and each of the imaging surfaces; and wherein the vias establish parallel electrical connections to each imaging surface; and the vias of each imaging surface occupy no more than 25% of the surface area of the imaging surface.

44. An LCD array comprising:

a semiconductor substrate;

a metal circuitry layer formed above the semiconductor substrate;

an insulating layer formed above the metal circuitry layer;

a plurality of reflective imaging surfaces formed above the insulating layer; and exactly two vias between the metal layer and each of the imaging surfaces; and wherein each of the vias passes through the insulating layer.

* * * * *